United States Patent [19]
Weiss

[11] Patent Number: 4,873,478
[45] Date of Patent: Oct. 10, 1989

[54] METHOD AND APPARATUS FOR CONTROLLING AN ALTERNATING CURRENT MOTOR PARTICULARLY AT LOW SPEEDS

[75] Inventor: Herbert W. Weiss, Salem, Va.

[73] Assignee: General Electric Company, Salem, Va.

[21] Appl. No.: 282,902

[22] Filed: Dec. 12, 1988

Related U.S. Application Data

[63] Continuation of Ser. No. 876,031, Jun. 19, 1986, abandoned.

[51] Int. Cl.⁴ .............................................. H02P 1/26
[52] U.S. Cl. .................................... 318/779; 318/723; 318/809
[58] Field of Search ............... 318/722, 723, 778, 779, 318/799–803, 807–811, 138, 254

[56] References Cited

U.S. PATENT DOCUMENTS

| | | | |
|---|---|---|---|
| 3,696,278 | 10/1972 | Kuniyoshi et al. | 318/138 |
| 3,991,354 | 11/1976 | Rosa et al. | 318/800 |
| 4,426,611 | 1/1984 | Espelage et al. | 318/803 |
| 4,443,747 | 4/1984 | Chausse et al. | 318/723 |
| 4,449,087 | 5/1984 | Lippitt et al. | 318/723 |
| 4,488,101 | 12/1984 | Studtmann | 318/811 |
| 4,602,198 | 7/1986 | Weiss et al. | 318/798 |

OTHER PUBLICATIONS

"Thyristor Phase-Controlled Converters and Cycloconverters" by Brian R. Pelly Lib. Cong. Cat. Card No. 70-125276, pp. 145-161.

Primary Examiner—David Smith, Jr.
Attorney, Agent, or Firm—Arnold E. Renner

[57] ABSTRACT

A system for controlling a polyphase electric motor, particularly at low speeds, using a load commutated inverter includes the generation of half sine wave signals within a range of desired frequencies which are subsequently converted to single phase alternating current power for application to selected windings of the motor. In a single channel polyphase embodiment, motor starting is achieved using zero current commutation and normal phase control. A two channel embodiment results in what amounts to two phase operation of the motor.

27 Claims, 4 Drawing Sheets

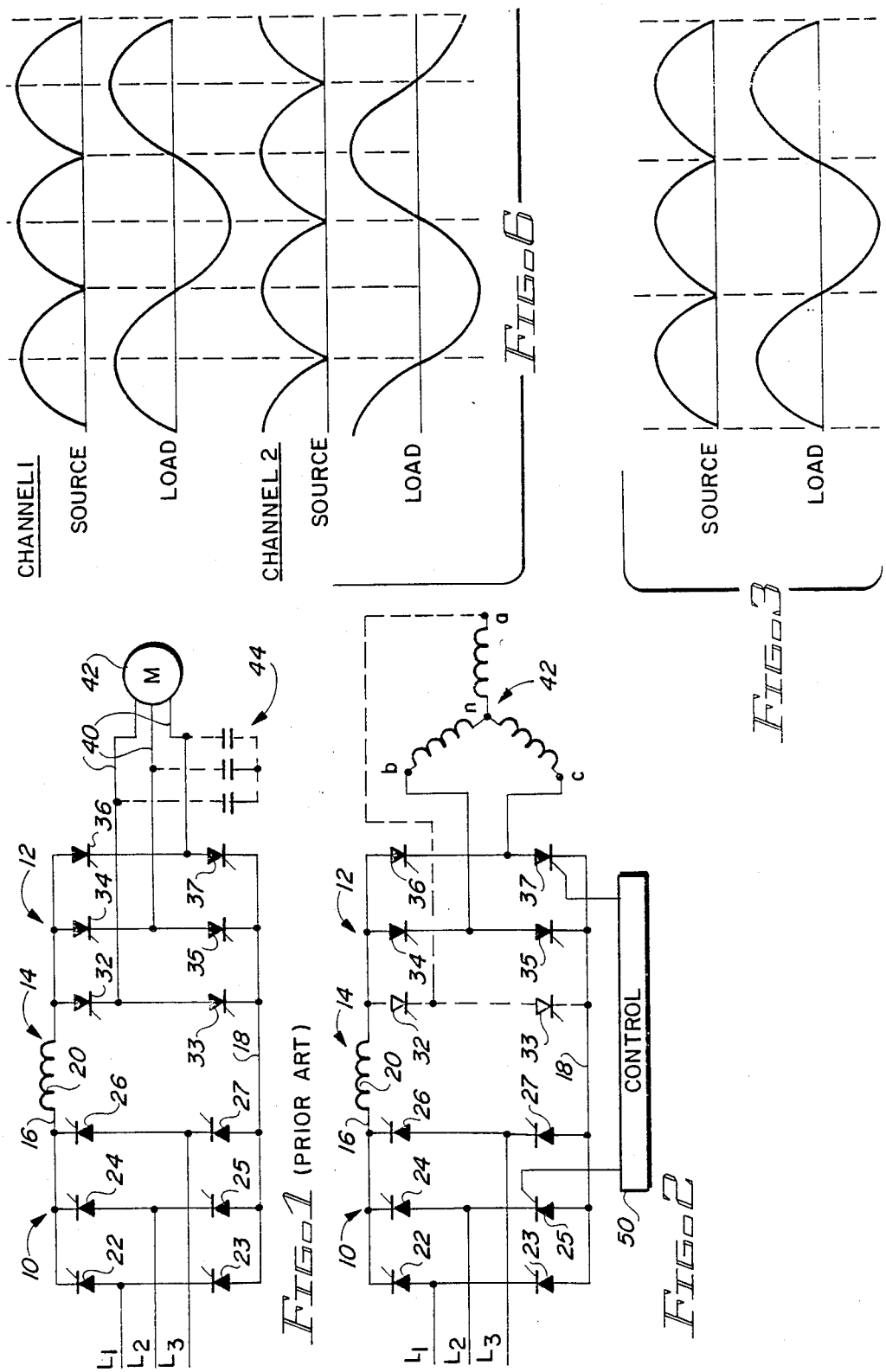

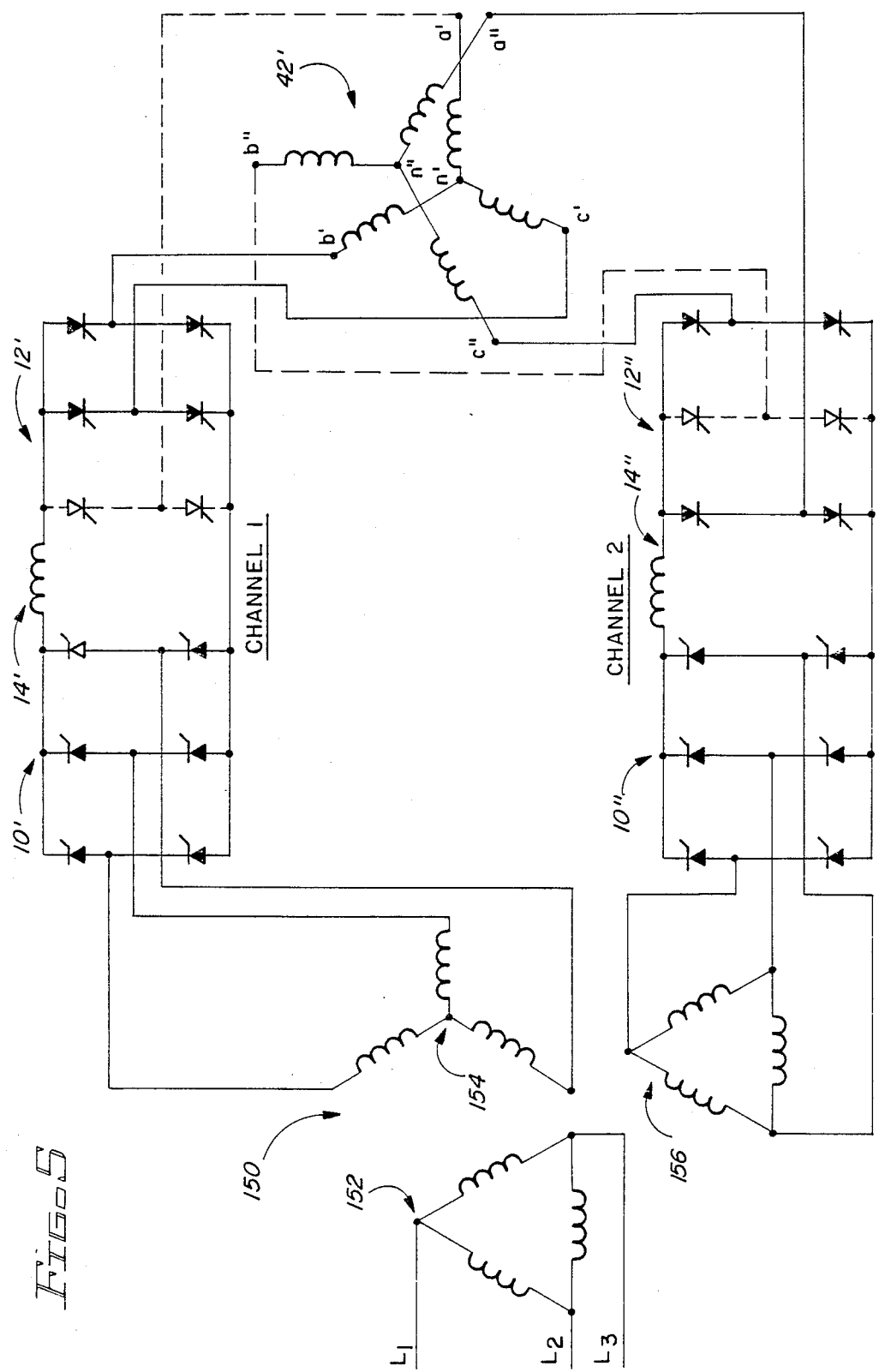

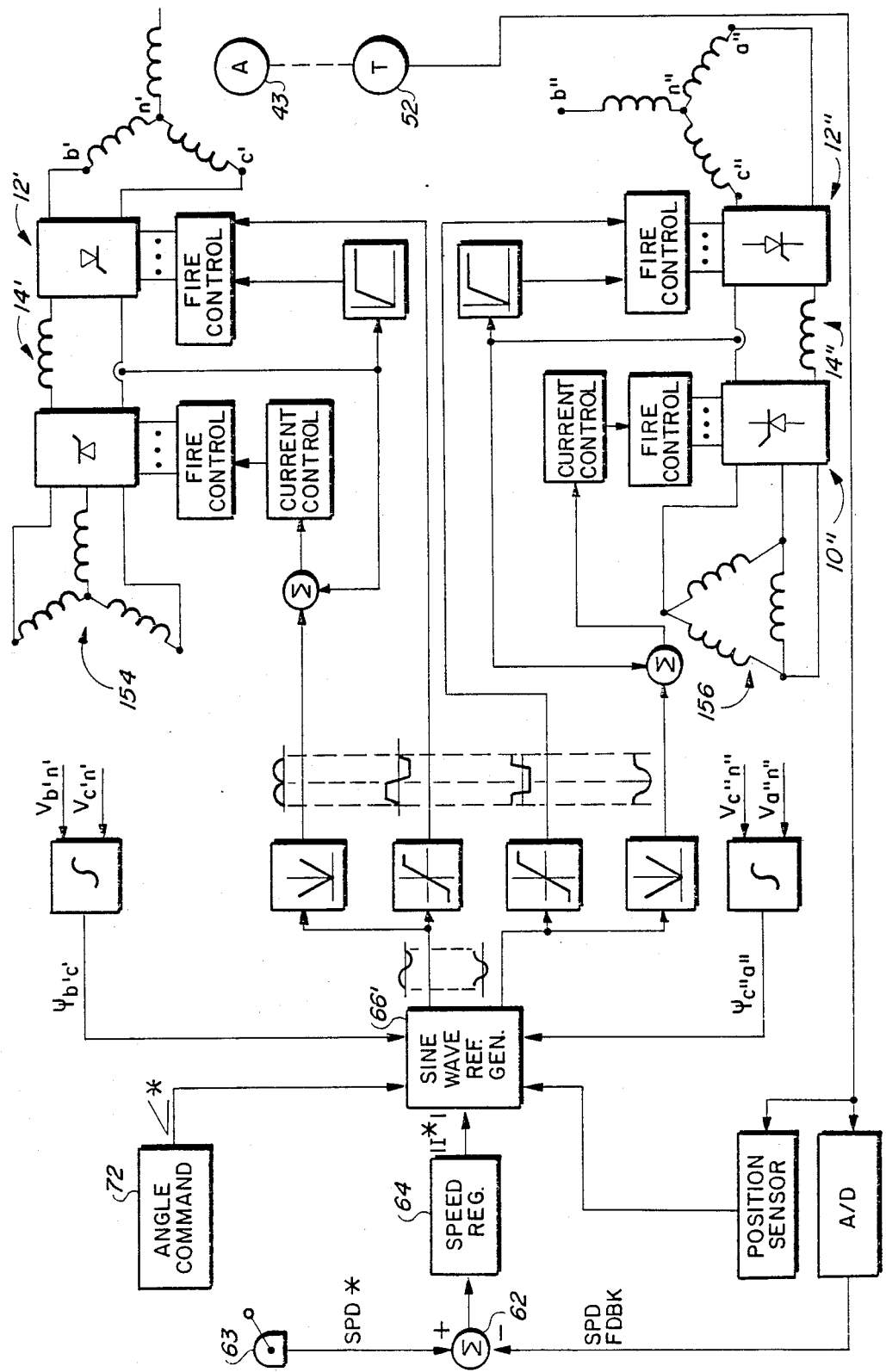

METHOD AND APPARATUS FOR CONTROLLING AN ALTERNATING CURRENT MOTOR PARTICULARLY AT LOW SPEEDS

This is a continuation of co-pending application Ser. No. 876,031 filed on June 19, 1986, now abandoned.

BACKGROUND OF THE INVENTION

The present invention relates generally to the control of a polyphase alternating current (ac) motor and more particularly to the control of the torque and speed of an ac motor, particularly in the starting mode and low rotating speeds.

A large number of systems are known for controlling the operation of a polyphase (typically, three-phase) electric motor. One commonly employed system is the socalled load commutated inverter. In its customary threephase embodiment, a load commutated inverter comprises a source side converter connected to a suitable source of power such as three-phase power lines and a load side converter connected to the source side converter by way of a direct current (dc) link circuit. Each of the converters is comprised of six legs of controlled semiconductor devices (e.g., thyristors). The source side converter converts the ac power into dc power which is supplied via the link circuit to the load side converter which changes the dc power to variable frequency ac power to be supplied to the load, for example, a motor. As is well known in the art, the magnitude of the voltage (and current) supplied to the motor is fundamentally a function of phase controlling the source side converter while the frequency of the power supplied to the load is the basic function of the load side converter - often referred to as an inverter.

A prime advantage of the load commutated inverter is its simplicity. That is, the load commutated inverter depends upon the load to which it is connected to develop the requisite reactive volt-amperes (VARs) to commutate (turn off) the control devices or thyristors of the load side converter. This is opposed to other types of converters, generally classified as self commutating inverters, such as controlled current inverters or pulse width modulated inverters which require some additional commutating scheme, such as commutating capacitors or commutating networks, to effect a commutation of the thyristors of the bridge network.

It is known that a major problem in load commutated inverters is to develop sufficient reactive volt-amperes (VARs) to commutate the thyristors of the bridge. This is particularly true at low speed operation. The load commutated inverter or, LCI, as it is more commonly known, was first used with synchronous ac machines and utilized the voltage at the stator terminals of that machine to commutate the inverter. At startup and at low speeds, however, the terminal voltage of a synchronous machine is not sufficient to commutate the thyristors of the inverter and thus some other technique is necessary to effect thyristor commutation. The most commonly used method for startup and low speed operation is to force the current in the dc link circuit to zero by controlling the action of the source side converter and to change the gating of the load side converter prior to re-establishing current to the stator. Since the load side inverter firing must be changed every 60 electrical degrees, the dc link current must be brought to zero six times for each cycle of the load voltage. This current pulsing action can create power pulsations which result in undesirable shaft torque pulsations in many applications.

One example of a LCI controlling a synchronous type motor may be found in U.S. Pat. No. 4,443,747 "Transitioning Between Multiple Modes of Inverter Control in a Load Commutated Inverter Motor Drive" by B. P. Chausse et al., which patent includes, inter alia, a discussion of the zero current mode of operation just discussed. Another example of such a load commutated inverter may be found in U.S. Pat. No. 4,449,087 "Flux Feedback Firing Control for a Load Commutated Inverter" by D. L. Lippitt et al. Both of these patents are assigned to the assignee of the present invention and specifically incorporated hereinto by reference.

Subsequent to the development of the use of the LCI with synchronous motors, this same type of system was employed in an alternating current induction motor drive by connecting capacitors in parallel with the induction motor to supply the lagging VARs required by that motor and the load side inverter. An example of this type of application of the LCI may be found in U.S. Pat. No. 4,602,198 "Induction Motor Drive Using Load Commutated Inverter Circuit" by L. H. Walker et al., issued July 22, 1986 which patent is also assigned to the assignee of the present invention and is specifically incorporated hereinto by reference. As in the case of the use of the LCI with the synchronous motor, the application of the shunt capacitors to the induction motor to supply the lagging VARs is only practical at higher voltage and frequency of the adjustable speed motor drive system where the capacitor current is relatively high. Depending upon the system design and power requirements, the capacitor circuit isnot normally capable of supplying the VAR requirements to the system below a certain speed. This, typically, is approximately 50 percent of rated speed. As such, some strategy must be used to start and accelerate this type of drive to about this point.

A second problem involved in the startup control strategy of the LCI induction type system is one of resonance between the shunt capacitors and the motor leakage inductance. One criterion in the selection of the capacitors is that the resonant frequency is not within the normal operating speed range of the motor. With a 50 percent operating speed range, the resonance frequency would normally be selected to be approximately 135 Hertz which is the fifth harmonic of the fundamental motor frequency at 27 Hertz corresponding to approximately 45 percent speed. If the startup control is a six step inverter, which is typical in a three phase system, there will be harmonic orders of 5, 7, 11, 13, etc., of the fundamental which will excite resonance at drive speeds of 45, 32, 20, 17, etc, percent. Since the resonance is undamped, it is not advisable to operate at these speeds with six step wave forms.

A further application of the load commutated inverter is in what is known as a twelve pulse ac motor drive system. This type of system includes two parallel, substantially identical paths each including a load commutated inverter system. The paths are, however, operated phase displaced with respect to one another and, additionally, the outputs of the inverter portions of the LCIs are connected to separate sets of windings within the motor which are also phase displaced from one another. The result is that the voltages and the currents in the respective sets of windings are typically separated by approximately 30 degrees. An example of such a system is found in U. S. Pat. No. 4,426,611, "Twelve Pulse Load Commutated Motor Drive System" by P. M. Espelage et al. issued Jan. 17, 1984. This patent is assigned to the assignee of the present invention and is specifically incorporated hereinto by reference. The twelve pulse system, while generally providing a smoother operation than available with a standard six pulse, three phase motor, is still subject to the power pulsations and resultant undesirable shaft torque pulsations as described above.

SUMMARY OF THE INVENTION

It is, therefore, an object of the present invention to provide an improved method and apparatus for controlling the operation of an alternating current motor, particularly at low speeds.

It is a further object to provide an apparatus and method for utilizing a load commutated inverter to provide improved control of motor speed and torque, particularly at low speeds.

It is a further object to provide a method and apparatus for the control and operation of an alternating current motor through the use of a load commutated inverter system, particularly at low operating speeds, by operating a source side converter of the system in a "cycloconverter" mode of operation to produce an output of half sine wave currents within a desired range of frequencies while operating the load side converter as a reversing switch to thereby supply what amounts to single phase ac power to a portion of the windings of the motor.

It is an additional object of the present invention to provide an apparatus and method of utilizing a load commutated inverter for starting and operating at low speeds an alternating current machine by first employing the method of reducing the current in the load commutated inverter to zero to permit commutation of the load side converter thyristors up to a desired speed and subsequently operating the source side inverter in a cycloconverter mode of operation to produce half sine wave currents within a desired range of frequencies while operating the load side portion converter of the system as a reversing switch to supply single phase alternating current electrical power to said load.

It is an additional object of the present invention to provide an apparatus and method for the control of the current and torque of an alternating current polyphase motor having at least two sets of three phase windings by supplying the motor with two phases of electrical power by parallel load commutated converter channels which provide output currents phase displaced with respect to one another 90 electrical degrees to operate said motor as a two phase motor at low speeds.

The foregoing and other objects are achieved in accordance with the present invention by providing a scheme in which the electrical power is supplied to an alternating current motor from a polyphase alternating current source by way of a supply channel including a controllable ac to dc source side converter connected to a dc to ac load side converter by way of a dc link circuit. Low frequency, low speed operation of the motor is achieved by operating the source side converter in a cycloconverter type mode to provide an output of half sine wave currents at desired frequencies and operating the load side converter as a reversing switch to supply single phase alternating current electrical power to the motor.

In a modification and further embodiment of the present invention, the motor is operated as described above once it reaches a set predetermined speed below which the motor is operated by effecting commutation of the load side inverter through reducing the dc current to zero.

In a further embodiment, two load commutated inverters are employed and connected, respectively, to separate sets of phase displaced windings of an ac motor to separately supply the power to those windings. Because of the phase displacement existing between the windings and by the phase displacement within the channel, the single phase ac power which is selectively supplied to the different motor winding sets results in running the motor at low speeds as a two phase motor.

BRIEF DESCRIPTION OF THE DRAWING

While the present invention is described in particularity in the claims annexed to and forming a part of this specification, a better understanding of the invention can be had by reference to the following description taken in conjunction with the accompanying drawing in which:

FIG. 1 is a schematic representation of a typical load commutated inverter motor drive as is known in the prior art;

FIG. 2 is a schematic representation of the power circuit of the basic scheme of the present invention;

FIG. 3 shows wave forms useful in understanding the operation of the present invention as depicted by FIG. 2;

FIG. 5 is a schematic power level diagram of the two channel, twelve pulse motor drive embodiment of the present invention;

FIG. 6 shows wave forms useful in understanding the operation of the embodiment shown in FIG. 5; and FIG. 7 is a schematic diagram illustrating one form of control for the power scheme illustrated in FIG. 5.

DETAILED DESCRIPTION

Figure 4:
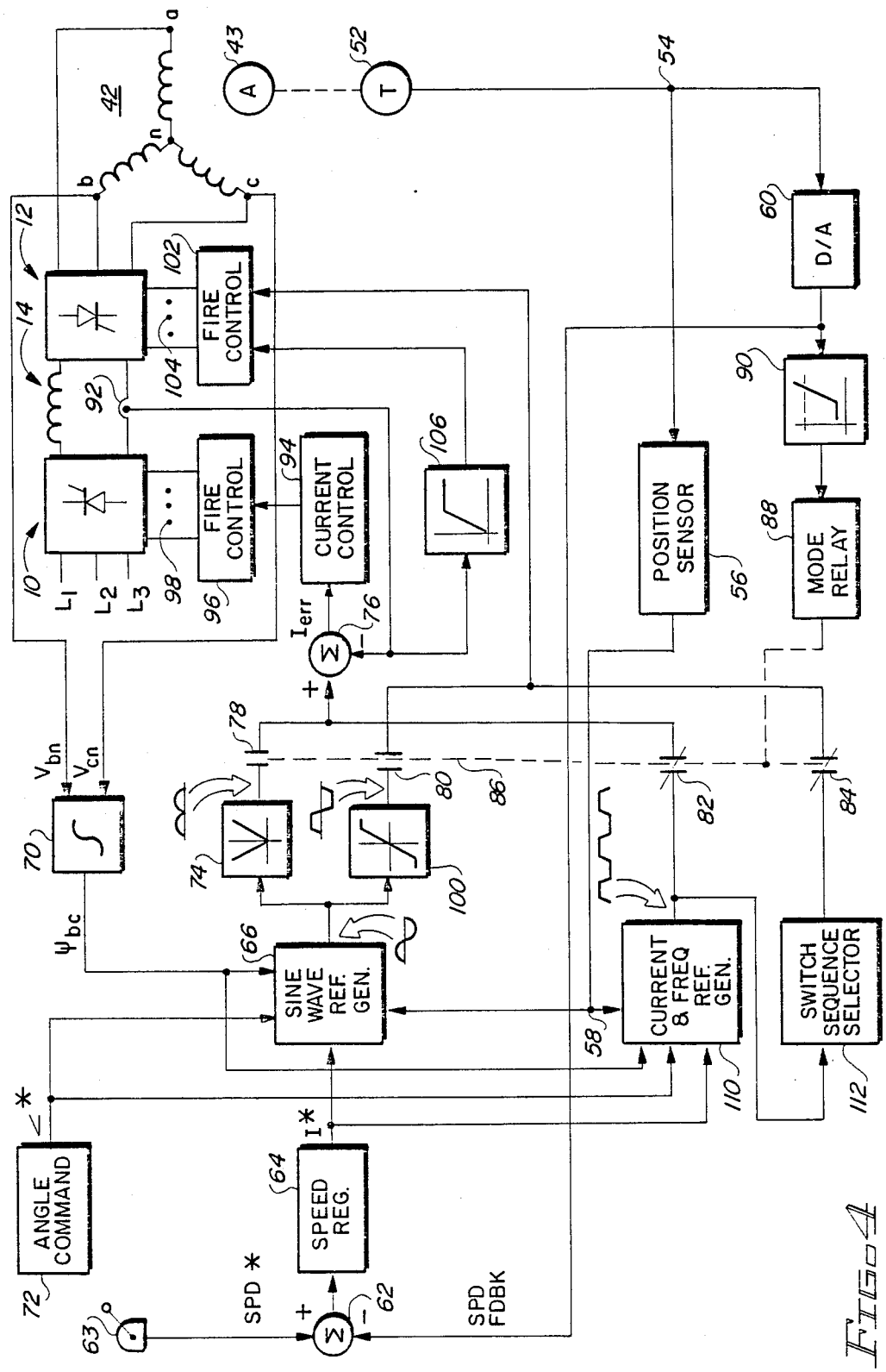
FIG. 4 is a schematic diagram illustrating one form of control and operation of the present invention such as shown in FIG. 2.

Reference is now made to FIG. 1 which shows a typical three phase load commutated inverter drive such as is well known in the prior art. The load commutated inverter (LCI) includes a source side converter 10 connected to a load side converter 12 (often referred to as an inverter) by way of a dc link circuit comprised of lines 16 and 18 and a smoothing inductor 20. In the three phase version depicted in FIG. 1, the source side converter 10 is comprised of six controlled rectifiers or thyristors 22 through 27 in a six leg bridge arrangement. The midpoints of each pair of legs is connected to a source of electrical power indicated by lines $L_1$, $L_2$ and $L_3$. The source side converter 10 converts the alternating current power of the source into direct current power for application to the inverter 12 via dc link circuit 14. As is known in the art, the magnitude of the current and the effective voltage the system can be controlled by a phase controlling the thyristors of bridge 10. As also will be demonstrated and is known, bridge 10 can be operated in a "cycloconverter" mode of operation to provide half sine wave signals of desired frequencies. Normally these frequencies will not exceed the frequency of the ac source voltage at lines $L_1$, $L_2$ and $L_3$.

The load side converter 12 takes the dc power from the dc link circuit 14 and converts it to alternating current power at desired frequencies. Similarly to converter 10, inverter 12 is comprised of six thyristors 32 through 37 disposed in a three phase bridge arrangement with the junctures of the legs of the bridge being connected to a load 42 by way of lines 40. Load 42 is shown as an alternating current motor. In the typical LCI configuration, motor 42 may be either a synchronous or an induction motor as earlier discussed. If motor 42 is a synchronous motor, the configuration thus far described is sufficient for operation since, at appropriate speeds, the synchronous motor provides commutation VARs for the thyristors of the load side converter. As described in U.S. Pat. No. 4,602,198, if motor 42 is of the induction type, then sufficient VARs may not be available for converter commutation in which case a capacitor circuit 44 (shown in dash-line phantom) may be necessary for proper operation of the load side inverter. If further description of the basic LCI drive is desired, attention is directed to the aforementioned and incorporated by reference patents.

Reference is now made to FIG. 2, and its associated wave form FIG. 3, which demonstrate the present invention in its most elementary form. Again, there is shown the basic LCI circuit in which a source converter 10 is connected to a three phase power source as presented by the lines $L_1$, $L_2$ and $L_3$. Converter 10 is connected by way of a link circuit 14 to the load side converter or inverter 12. It is noted, however, in this case that two of the thyristors (32 and 33) of inverter 12 are illustrated in phanthom since, in the invention in its most basic form, two legs of the inverter 12 are not used. The other four legs of the inverter 12, that is, thyristors 34–35 and 36–37, have their midpoints connected respectively to b and c terminals of the three phase stator winding of motor 42. This winding is comprised of the windings bn, cn and an. Also, as is shown in phantom, the a terminal of the motor 42 is connected to the midpoint of the inverter legs shown in phantom illustrating that, while this winding does not enter into this particular aspect invention, in later operation when the motor reaches appropriate speed, the winding is employed. That is, operation is standard in accordance with the prior art. As illustrated by the representative connections to thyristors 25 and 37, all thyristors of the LCI drive are under the suitable phase control 50 which will be more fully understood as this description proceeds.

In accordance with the present invention, the source side converter 10 is operated in a cycloconverter mode to provide an output of half sine waves within the desired frequency range. (This type of operation is explained in detail in the text *Thyristor Phase-Controlled Converters and Cycloconverters* by Brian R. Pelly, Copyright 1971 by John Wiley and Sons, Inc., Library of Congress Catalog Card Number 70-125276, starting particularly at page 145, which text is specifically incorporated hereinto by reference.) The output of the source side converter 10 under control 50 is illustrated (FIG. 3) in the trace labeled "Source". These half sine waves are at a frequency normally not exceeding that of the frequency of the source designated by $L_1$, $L_2$ and $L_3$. For example, if this source is at 60 Hertz, then the half wave outputs of the source side converter would vary from approximately zero to sixty half cycles per second. The output of the converter 10 is applied to the dc link circuit 14. Since the frequency of that output is considerably lower than that for which the circuit is designed, the effect of the filtering inductor 20 on the half sine waves is relatively small and thus the half sine wave configuration appears on the lines 16 and 18 at the input to the inverter 12. As earlier indicated, only four legs of the inverter 12 are utilized in this mode of the invention. In response to gating signals from control 50 these four legs of inverter 12 act as a reversing switch such that the output of inverter 12 is applied to the two windings bn and cn, which are in effective series connection. This output is illustrated in the lower ("Load") trace of FIG. 3 and is an alternating current sine wave. Thus, the motor 42 is operated as a single phase motor and the oscillation and torque pulsations earlier described are eliminated. As demonstrated by FIG. 3, the sine wave is one-half of the frequency of the half waves developed by the source side converter 10. The apparatus and method of the basic form of the invention, thus, is effective from the time that rotor motion has started and until approximately one-half of the motor rated speed; that is, one-half of the frequency of the source ($L_1$, $L_2$, $L_3$) at which time normal operation in accordance with the aforementioned patents will take effect.

It is noted that the operation in accordance with the basic mode of the invention was stated to be after rotation has begun. This is because a three phase motor will not start under single phase power. Thus, in accordance with another embodiment or another feature of the present invention, the motor is started and operated in accordance with known methods up to a predetermined speed after which operation in the basic mode just described is effected.

Typically, this predetermined speed is at approximately 10 percent of rated speed or at 10 percent of the frequency of the source voltage. Operation from zero to this predetermined speed is preferably by control of the converter 10. To ensure commutation of the thyristors of the inverter 12 (all six being used in this case), converter 10 is phase controlled to assure that the current, in the dc link circuit is discontinuous. Thus, this embodiment of the invention calls for initial operation of the source side converter in a phase control mode to deliver discontinuous current to the load side inverter 12 to effect commutation of the thyristors of that inverter. After reaching a predetermined speed (for example 10 percent of rated) the operation is switched to the basic invention mode, i.e., operating the source side converter to develop half sine wave power (cycloconverter type action) and the load side inverter as a reversing switch to deliver single phase power to the load.

While a variety of control systems could be employed to implement the methods of the present invention, one such system is illustrated in FIG. 4. Referencing now that figure, shown are the source side converter 10 and the load side converter 12 connected by dc link circuit 14. The output of the inverter is connected to the stator windings of a machine 42 which also includes an armature 43. Armature 43 has connected thereto a suitable tachometer/position sensor 52 (e.g., (a slotted disk with index point as known in the art) which provides an output signal on line 54 to two units. The first of these is a position sensor 56 which converts the tachometer index signal to a position signal for output to a node 58 as will be further described. In addition, the signal on line 54 is supplied to a suitable digital-to-analog converter 60 the output of which is a signal (speed feedback) representing the actual speed of the motor. This speed feedback signal serves as one input to a summing junction 62 a second input to which is a signal (SPD*) representing the desired speed. The SPD* signal is derived from some suitable source such as an operator input 63. Other sources such as some form of automated control, etc., could also serve as this source.

The output of the summing junction 62 is a signal representing any error or difference between the actual speed and the desired speed. This error signal is applied to a suitable speed regulator (gain block) 64 the output of which is a signal I* representing the change in current which is required to cause the motor to correct its speed. The signal I* is applied to a sine wave reference generator 66. An additional input to the sine wave generator 66 is the signal from node 58 which is from the position sensor 56. This latter signal is used in the motor starting operation to adjust the phase of the output of sine wave generator 66 to select proper phase of that output signal with respect to the rotor postion and the firing of the thyristors of the source side inverter 12. A further input to the generator 66 is a signal ($\Psi_{bc}$) proportional to the motor flux. This signal can be generated in a number of ways; e.g., flux coils within the motor. In FIG. 4 the $\Psi_{bc}$ signal is shown as being generated by integrating the motor voltage in an integrating circuit 70. Signals representing the voltage applied to at least two windings of the motor, windings bn and cn are applied to integrator 70 to produce the $\Psi_{bc}$ signal.

The last input to the sine wave reference generator 66 is a signal representing a desired angle of current with respect to the motor flux, specifically the angle with respect to the flux to give a phase relationship with respect to the firing of the thyristors of the two converters 10 and 12. The signal is generated by suitable means such as operator input 72.

The output of the sine wave generator 66 is a signal in the form of a sine wave which has a magnitude proportional to the I* signal, a frequency proportional to the $\Psi_{bc}$ signal and a phase relationship with respect to the flux signal in proportion to the angle signal from element 72. This sine wave output signal is applied to an absolute magnitude circuit 74 which provides at its output a signal which is a full wave rectification of the output of the generator 66. This rectified signal is applied by way of a switch 78 as one input to a summing junction 76.

Switch 78 is shown as a normally open switch, as is switch 80, while switches 82 and 84 are illustrated as normally closed. The four switches are "ganged" as indicated by dashed line 86. The position of the switches is a function of a mode relay 88 which is under the control of a threshhold amplifier 90. Threshhold amplifier 90 receives an input signal from the digital-to-analog converter 60 such that the mode relay 88 will be operative to change the position of the switches when motor operation reaches the predetermined speed earlier discussed.

For the purposes of beginning this discussion, it is initially assumed that the motor is running at a speed sufficient to activate the mode relay and thus switches 78 and 80 are closed and switches 82 and 84 are open. Returning now to the control proper, the summing junction 76 also receives an input signal from a current transformer 92 in the dc link circuit 14. The signal from transformer 92 is a replica of the current in circuit 14. With these two inputs the output of the summing junction 76 is a current error signal ($I_{err}$) representing any required change in the firing of the rectifiers of the source side inverter 10 to force the current in the dc link circuit to correspond in phase, magnitude and frequency the output of the function block 74. The $I_{err}$ signal is applied to a current control 94 the output of which governs a fire control 96 which provides gating signals on lines 98 to the thyristors of converter 10. This portion of the control, in the mode presently being discussed, causes the converter 10 to run in the cycloconverter type action to provide on the dc link circuit 14 the series of half sine waves all as earlier explained.

The output of the sine wave reference generator 66 also is applied to a high gain circuit 100 which provides at its output a polarity signal which approximates a square wave at the frequency of the output of the generator 66. This signal is applied via switch 80 (presently assumed to be in the closed position) to a fire control 102 for the load side converter 12 which, in turn provides the appropriate firing signals to the associated thyristor gate terminals by way of lines 104 to cause the reversing switch to operate and thus establish the polarity of the power supplied to the motor windings. A second input to fire control 102 is a signal from a threshhold circuit 106 which is connected to the current transformer 92. Circuit 106 will provide a zero level signal when the line circuit current is zero to enable the fire control 102. Under these conditions, fire control 102 will cause the thyristors of the load side inverter to provide to the windings bn and cn of motor 42 a single phase alternating current such as is illustrated in the "Load" trace of FIG. 3.

The remaining depiction in FIG. 4 is the control for effecting the starting mode of the invention. In essence this control causes the LCI to provide normal three phase power to the load 42 to bring the motor from rest to the designated speed. In this regard, there is provided a current and frequency reference generator 110 which receives as its input the position sensor signal at node 58 as well as the I*, $\Psi_{bc}$ and angle signals.

Generator 110 provides as its output a series of substantially square wave pulses which have a magnitude and a frequency proportional to the magnitude and frequency desired as the output of the converter 10. This signal is applied by way of switch 82 which, below the predetermined speed is closed, to the summing junction 76 which also receives the signal from the current transformer 92. The resulting error signal causes the source side converter 10 to operate in a phase controlled mode at a frequency corresponding to that of the source ($L_1$, $L_2$, $L_3$) to provide current of a magnitude proportional to the I* signal. The output of the generator 110 is also applied to a switch sequence selector 112 the output of which, via switch 84, serves as an input to the fire control to control the switching of the thyristor legs in load side converter 12 and hence the frequency of the power furnished to the motor 42-in this case to all three windings. By virtue of the output of threshhold circuit 106 switching of the thyristors of the inverter 12 occurs only when current in the dc link circuit is zero.

From the foregoing it is seen that the motor is brought from rest to a predetermined speed condition by controlling the load commutated inverter drive in the normal mode of a three phase operation while assuring commutation of the thyristors of the inverter 12 at zero current. After reaching that predetermined speed the LCI is controlled in the cycloconverter-reversing switch mode.

FIG. 5 and its accompanying wave form in FIG. 6 illustrate the application of the present invention in what is commonly referred to as a twelve pulse load commutated inverter drive system of the basic type described in U.S. Pat. Nos. 4,426,611 and 4,565,953 earlier referenced. In the twelve pulse system, the motor stator has two sets of windings which are phase displaced with respect to each other by 30 electrical degrees. These windings are illustrated in FIG. 5 using a prime and double prime notation corresponding to the showing in FIG. 2. Two LCI channels supply the two sets of windings. Channel 1 is connected to those having the prime designation and includes a source side converter 10', a load side inverter 12' and a link circuit 14'. Four legs of the load side converter 12 are connected to the b'n' and c'n' windings of the first set of windings. In a similar manner, channel 2 is comprised of like components designated by the double prime notation. In this case, however, the appropriate four legs of the load side converter 12' are connected to the a"n" and c"n" windings of the second set.

The two load commutated inverter circuits, or two channels, may be (although not necessarily) supplied, respectively, by a transformer arrangement indicated generally at 150 which includes a delta connected primary 152 connected to a power source $L_1$, $L_2$, $L_3$. A first secondary winding 154 of the transformer 152 is in a wye configuration and supplies the source converter 10' of channel 1. In a similar manner a delta connected secondary 156 supplies the source side converter 10" of channel 2. Operation of the power circuit illustrated in FIG. 5 is in accordance with the basic invention mode in which each of the source side converters is operated to produce half sine waves. Here, half sine waves are phase displaced between the channels by 90 electrical degrees (see FIG. 6). The load side inverters 12' and 12" are operated as reversing switches and thus their outputs are single phase sine waves which are 90 degrees phase displaced (FIG. 6). The ultimate result, in the power sense, is that the motor 42' operates as a two phase motor.

Since, the embodiment described with respect to FIGS. 5 and 6, operates as a two phase motor, the starting problems associated with the single phase motor are not prevelant. As such, a suitable control may be effected without the necessity of the starting requirement as described with respect to the embodiment of FIG. 4.

FIG. 7 depicts one possible control implementation for the power circuit of FIG. 6. It is immediately apparent that this control is essentially a dual application of the top half of the FIG. 4 control implementation; that is, the control portion which implements the cycloconverter-reversing switch mode. As such, it is believed unnecessary to describe in detail the operation. To facilitate an overall understanding, however, a sufficient number of the components have been designated by prime and double prime designations of similar components in FIG. 4. Where like identical components are used, the same designations have been employed for orientation purposes. Suffice it to say in this case, the primary distinction is that a sine wave generator here designated 66' receives flux signals from both the winding sets. As indicated, these signals are $\Psi_{b'c'}$ and $\Psi_{c''a''}$. Generator 66' provides two outputs for the respective control of the two channels. The two sine wave reference signals are phase displaced with respect to one another by 90 electrical degreees. In all other aspects the individual operations of the two channels are as earlier described.

While the present invention has been described in its preferred embodiments, modifications thereto will readily occur to those skilled in the art. It is not intended, therefore, that the invention be limited to the specific embodiments shown and described and it is intended that the appending claims shall cover all inventions in accordance with the true scope and spirit of the invention.

What is claimed is:

1. In a system for controlling the electrical power supplied to a polyphase alternating current motor having individual phase windings from a polyphase alternating current source using a supply channel including a controllable alternating current to direct current source side converter connected to a direct current to alternating current load side converter by way of a link circuit, a method of effecting low frequency operation of said motor comprising the steps:
    (a) operating said source side converter to provide a single output of half sine wave currents of the same polarity within a range of desired frequencies;
    (b) operating said load side converter as a reversing switch to thereby convert said half sine wave currents to one single phase sine wave alternating current electrical power; and,
    (c) furnishing only said one single phase sine wave power to at least two of said motor phase windings in effective series connection.

2. The invention in accordance with claim 1 wherein said motor is a three-phase electrical motor having a winding for each phase.

3. The invention in accordance with claim 1 wherein the range of desired frequencies at which said half sine wave currents are provided does not exceed the frequency of said alternating current source.

4. The invention in accordance with claim 2 further include the steps of:
    (a) generating signals representing a desired change in motor speed, actual motor flux, and a desired angle with respect to said motor flux;
    (b) generating a reference sine wave having a magnitude as a function of the desired change in motor speed signal, a frequency as a function of the motor flux signal and a phase relationship with respect to the motor flux as a function of said angle signal; and,
    (c) controlling said source side converter as a function of said reference sine wave.

5. The invention in accordance with claim 4 further including the steps of:
    (a) generating a position signal indicative of an extant position of a rotor of said motor; and,
    (b) phase adjusting said reference sine wave in time as a function of said position signal.

6. The invention in accordance with claim 4 further including the steps:
    (a) generating a signal proportional to the absolute magnitude of said reference sine wave;
    (b) developing a feedback signal proportional to the current in said link circuit;
    (c) combining said signal proportional to the absolute value and said feedback signal to yield a control signal; and,
    (d) controlling said source side converter in response to said control signal to thereby cause said source side converter to provide at its output said half sine wave currents.

7. The invention in accordance with claim 5 further including the steps:
    (a) generating a signal proportional to the absolute magnitude of said reference sine wave;

(b) developing a feedback signal proportional to the current in said link circuit;

(c) combining said signal proportional to the absolute value and said feedback signal to yield a control signal; and, (d) controlling said source side converter in response to said control signal to thereby cause said source side converter to provide at its output said half sine wave currents.

8. The invention in accordance with claim 1 further including the steps of:

(a) developing a zero level signal when current in said link circuit equals approximately zero;

(b) developing a polarity signal; and, (c) controlling said load side converter as a function of said zero level signal and said polarity signal.

9. The invention in accordance with claim 4 further including the steps:

(a) generating a signal proportional to the absolute value of said reference sine wave;

(b) developing a feedback signal proportional to current in said link circuit;

(c) combining said signal proportional to the absolute value of said reference sine wave and said feedback signal to develop a control signal;

(d) controlling said source side converter in response to said control signal to thereby cause said source converter to provide at its output said half wave sine wave currents;

(e) developing a zero level signal when current said link circuit equals approximately zero;

(f) developing a polarity signal; and, (g) controlling said load side converter as a reversing switch as a function of said zero level signal and said polarity signal.

10. A system for controlling the electrical power to a polyphase alternating current motor having individual phase windings from a polyphase alternating current source comprising:

(a) a controllable alternating current to direct current source side converter;

(b) a direct current to alternating current load side converter;

(c) a link circuit for connecting an output of said source side converter to said load side converter;

(d) means to control said source side converter to develop a single output of half sine wave currents of the same polarity within a range of desired frequencies;

(e) means to control said load side converter as a reversing switch to thereby convert the half sine wave output to one single phase sine wave alternating current electrical power; and, (f) means to supply only said one single phase alternating current electrical power to at least two of said motor phase windings in effective series connection.

11. The invention in accordance with claim 10 wherein said motor is a three-phase electric motor.

12. The invention in accordance with claim 11 wherein said source side converter comprises a three-phase bridge arrangement of thyristors and wherein said means to control said source side converter comprises:

(a) means to generate signals representing a desired change in motor speed, actual motor flux, and an angle with respect to said motor flux;

(b) means responsive to said signals to generate a reference sine wave having a magnitude as a function of the change in desired motor current, a frequency as a function of the motor flux signal and a phase relationship with respect to the motor flux signal as a function of said angle signal; and, (c) means to control said source side converter in response to said reference sine wave.

13. The invention in accordance with claim 12 wherein said means to control said source side converter includes:

(a) means to generate a signal proportional to the absolute magnitude of said reference sine wave;

(b) means to develop a feedback signal proportional to current in said link circuit;

(c) means to combine said signal proportional to the absolute magnitude and said feedback signal to yield a control signal; and, (d) means responsive to said control signal to selectively render the thyristors of said source side converter conductive to provide at its output said half sine wave currents.

14. The invention in accordance with claim 10 wherein said means to control said load side converter includes:

(a) means to develop a zero level signal when current in said link circuit is a substantially zero;

(b) means to develop a polarity signal; and (c) means to control said load side converter as a function of said zero level signal and said polarity signal.

15. The invention in accordance with claim 12:

(a) wherein said means to control said source side converter includes:

(1) means to generate a signal proportional to the absolute value of said reference sine wave, (2) means to develop a feedback signal proportional to current in said link circuit, (b 3) means to combine said signal proportional to the absolute value at said reference sine wave and to said feedback signal to develop a control signal, and, (4) means responsive to said control signal to selectively render the thyristors of said source converter conductive to provide at its output said half wave sine wave currents; and, (b) wherein said means to control said load side converter includes:

(1) means to develop a zero level signal when link current in said link circuit equals approximately zero, (2) means to develop a polarity signal, and, (3) means to control said load side converter as a reversing switch as a function of said zero level signal.

16. In a system for controlling the electrical power supplied to a polyphase alternating current motor, having a first and second sets of individual phase windings displaced with respect to each other, from an alternating current source using two similar supply channels connected in parallel between said source and said motor, each of said channel including a controllable alternating current to direct current source side converter connected to a direct current to alternating current load side converter by way of a link circuit, a method of effecting low speed operation of said motor comprising the steps:

(a) operating the source side converter of a first of said channels to provide a single output of half sine wave currents of the same polarity within a range of desired frequencies;

(b) operating the source side converter of a second of said channels to provide a single output of half sine wave currents of the same polarity and of essentially the same low frequency as the output of said first channel but phase displayed in time by approximately 90 electrical degrees with respect to the currents of said first output;

(c) operating each of said load side converters as a reversing switch to thereby furnish, from each of said load side converters, one single phase sine wave electrical power output, the output the load side converter of said second channel being phase displaced in time by approximately 90 electrical degrees with respect to the output of the load side converter of said first channel; and (d) furnishing only the outputs of said load side converters, respectively to at least two phase windings, in effective series connection, of an associated set of phase windings.

17. The invention in accordance with claim 16 wherein the range of desired low frequencies at which the half sine wave currents are provided does not exceed the frequency of the alternating current source.

18. The invention in accordance with claim 16 wherein said polyphase motor is a three phase motor and wherein each of said two sets of the windings comprises three individual phase windings.

19. The invention in accordance with claim 16 further including the steps of:

(a) generating a current signal representing a desired change in motor speed;

(b) generating first and second flux signals representing, respectively, the actual flux developed by said first and second sets of windings;

(c) generating an angle signal representing a desired electrical angle with respect to said motor flux;

(d) developing a first reference sine wave for a first of said channels as a function of said current signal, said first flux signal and said angle signal;

(e) developing a second reference sine wave for a second of said channels as a function of said current signal, said second flux signal and said angle signal; and, (f) controlling the source side converter of said first channel in response to said first reference sine wave and the source side converter of said second channel in response to said second reference sine wave.

20. The invention in accordance with claim 19 further including the steps, for each of said channels:

(a) generating a signal proportional to the absolute magnitude of the reference sine wave for that channel;

(b) developing a feedback signal proportional to the current in the link circuit of that channel;

(c) combining said signal proportional to the absolute value and said feedback signal to yield a control signal; and, (d) controlling said source side converter of that channel in response to said control signal to thereby cause that source side converter to provide at its output said half sine wave currents.

21. The invention in accordance with claim 16 further including, for each of said channels, the steps of:

(a) developing a zero level signal when the current in the link circuit equals approximately zero;

(b) developing a polarity signal; and, (c) controlling the load side converter of that channel as a function of the zero level signal.

22. The invention in accordance with claim 19 further including, for each of said channels, the steps:

(a) of generating a signal proportional to the absolute value of the reference sine wave for that channel;

(b) developing a feedback signal proportional to current in the link circuit of that channel;

(c) combining said signal proportional to the absolute value in said feedback signal to develop a control signal;

(d) controlling the source side converter of that channel in response to said control signal to thereby cause that source converter to provide at its output said half sine wave currents;

(e) developing a zero level signal when current in said link circuit equals approximately zero;

(f) developing a polarity signal; and (g) controlling the load side converter of that channel as a reversing switch as a function of that zero level signal and said polarity signal.

23. In a system for controlling the operation of polyphase electric motor connected to a source of electrical power by way of a load commutated inverter circuit comprising an alternating current to direct current source side converter connected to a direct current to alternating current load side converter by way of a link circuit, each of said converters comprised of a plurality of controlled semiconductor devices, a method for starting and operating said motor comprising the steps:

(a) controlling the power in a first mode of operation from approximately zero speed to a predetermined value comprising the steps:

(1) operating said source side converter in a phase controlled mode to supply a discontinuous current to said load side converter via said link circuit, (2) sensing a zero current condition in said link circuit, and (3) selectively changing the conductive states of the load side converter switches at times of zero current until reaching said predetermined speed to thereby furnish electrical power to said motor; and, (b) controlling power in a second mode of operation after motor speed has exceeded said predetermined value comprising the steps:

(1) operating said source side converter to provide an output of half sine wave currents within a range of desired frequencies, and, (2) operating said load side converter as a reversing switch to thereby convert said half sine wave currents to single phase alternating electrical power motor; and (3) furnishing said single phase electrical power to said motor.

24. The invention in accordance with claim 23 wherein said motor is a three-phase electric motor having a winding for each phase and wherein said single phase alternating current electrical power from said load side converter is furnished to two of said windings.

25. The invention in accordance with claim 23 wherein said predetermined value in speed is approximately ten percent of rated motor speed.

26. The invention in accordance with claim 23 further including the steps of:
(a) generating signals representing a desired change in motor speed, actual motor flux, and a desired angle with respect to said motor flux;
(b) generating, in response to said signals, a reference sine wave, in response to said parameter signals, having a magnitude as a function of the desired change in motor speed signal, a frequency as a function of the motor flux signal and a phase relationship with respect to the motor flux signal as a function of said angle signal; and,
(c) controlling said source side converter as a function of said reference sine wave.

27. The invention in accordance with claim 26 further including the steps:
(a) generating a signal proportional to the absolute magnitude of said reference sine wave;
(b) developing a feedback signal proportional to the current in said link circuit;
(c) combining said signal proportional to the absolute value and said feedback signal to yield control signal; and,
(d) controlling said source side converter in response to said control signal to thereby cause said source side converter to provide at its output said half sine wave currents.

* * * * *